United States Patent [19]
Bottorff et al.

[11] Patent Number: 5,122,637
[45] Date of Patent: Jun. 16, 1992

[54] TEMPERATURE CONTROLLED SOLDERING IRON HAVING LOW TIP LEAKAGE VOLTAGE

[75] Inventors: Bruce D. Bottorff, Shelbyville; Robert A. Longstreet, Manilla; Marland J. Ratekin, Rushville, all of Ind.

[73] Assignee: Wellman Thermal Systems Corporation, Shelbyville, Ind.

[21] Appl. No.: 640,196

[22] Filed: Jan. 11, 1991

[51] Int. Cl.$^5$ .................. H05B 1/02; H05B 3/42; B23K 3/04
[52] U.S. Cl. ............................. 219/241; 219/229; 219/237; 228/51
[58] Field of Search ........ 219/241, 227, 229, 236–240; 228/51–55

[56] References Cited

U.S. PATENT DOCUMENTS

| | | |
|---|---|---|
| 2,582,481 | 1/1952 | Dvorak et al. ............. 219/241 |
| 2,717,952 | 9/1955 | Dvorak ...................... 219/241 X |
| 2,735,923 | 2/1956 | Juvinall et al. ............. 219/241 X |
| 2,747,074 | 5/1956 | Finch ........................ 219/241 X |
| 2,897,335 | 7/1959 | Finch . | 
| 3,654,427 | 4/1972 | Schoenwald ............... 219/241 |
| 3,669,306 | 10/1972 | Finch ....................... 219/241 |

FOREIGN PATENT DOCUMENTS

| | | |
|---|---|---|
| 2708967 | 9/1978 | Fed. Rep. of Germany ...... 219/241 |
| 143143 | 8/1980 | German Democratic Rep. ................................. 219/241 |
| 260032 | 11/1970 | U.S.S.R. ............................ 219/241 |

Primary Examiner—Anthony Bartis
Attorney, Agent, or Firm—Fitch, Even, Tabin & Flannery

[57] ABSTRACT

A temperature controlled soldering iron includes an elongated heater assembly with a hollow soldering tip at one end, containing a heating element and a temperature sensing element, which is responsive to the temperature of the tip. The heater assembly includes an outer conductive sheath concentrically disposed around an inner conductive sheath, both of which are attached to a steel bushing. A constantan rod is disposed within the inner sheath and connected to the bushing to form a thermocouple junction therewith. The heating element is connected at one end to the bushing and at the other end to a tubular conductor disposed around and insulated from the constantan wire. A temperature controller surveys the temperature sensed at the thermocouple junction by connection to the constantan wire and the outer sheath. The voltage applied between the tubular conductor and the inner sheath is automatically varied to control the temperature of the heater assembly.

10 Claims, 1 Drawing Sheet

TEMPERATURE CONTROLLED SOLDERING IRON HAVING LOW TIP LEAKAGE VOLTAGE

BACKGROUND OF THE INVENTION

The present invention relates to temperature controlled soldering irons, and particularly, to improvements in electrically controlled soldering irons having a soldering tip including both heating and temperature sensing apparatus.

Soldering irons are widely used in the electronics industry to heat electrical components and solder thereby melting the solder and forming both electrical and mechanical connections for the electrical components. Many types of components are connected in this manner and many different types of solder are used to make connections. The various components have varying sensitivities to the temperatures applied to their connecting leads and the various solders have different optimum melting points. Accordingly, it is desirable to have soldering irons with which the tip temperature can be regulated to best suit the solder and components being used.

One type of soldering iron includes a heating element having a resistance which varies in accordance with the heat generated by that heating element. As the heating element gets hot, the resistance increases thereby reducing the current flow through the heating element and thus, reducing the temperature generated by that heating element. The temperature of such heating elements can be controlled by manually varying the voltage applied to the heating element. Such control however, is only an approximation.

For more exact temperature regulation of the tip, soldering irons are known which include a substantially constant resistance heating element and a separate temperature sensing element in the soldering iron tip. A control apparatus continually surveys the tip temperature, as indicated by the temperature sensing element and regulates the voltage applied to the heater to maintain a constant preset temperature. One soldering iron having a heater and a separate temperature sensing element in the tip is disclosed in U.S. Pat. No. 3,699,306 to Finch.

Recent advances in semiconductors, particularly advances in integrated circuitry, have created electronic components which are more sensitive to higher temperatures than components were in the past. Equally important, the new semiconductor circuitry is extremely sensitive to stray voltages applied to the conductive leads thereof. The increased component sensitivity to applied voltages has been recognized by the United States Government which has promulgated a standard MIL-STD-2000 for soldering irons. MIL-STD-2000 specifies that the soldering iron tip to ground leakage voltage shall be less than 2 millivolts. This standard is difficult, if not impossible, to achieve with soldering irons of the type disclosed in the aforementioned Finch patent.

A need exists for soldering equipment having the accurate temperature controllability provided by separate heating and heat sensing elements in the soldering iron tip, while at the same time, limiting the leakage voltage at the tip below values required by government standards and modern semiconductor equipment.

SUMMARY OF THE INVENTION

A heating apparatus in accordance with the present invention comprises a first hollow conductive sheath disposed within a second hollow conductive sheath. A heating element and a heat sensing element are disposed within the first sheath and electrically connected to the sheaths such that the second (outer) sheath forms the return conductor for one end of the heat sensing element and the first (inner) sheath forms the return conductor for one end of the heating element. Separate electrical connections to the other ends of both the heat sensing element and the heating element are also brought out of the heater apparatus. The heat sensing circuitry of a temperature control unit is connectable between the second (outer) sheath and the other heat sensing connection and a power source is connectable between the first (inner) sheath and the other heating element connection. By the above connections, the second (outer) sheath which is electrically connected to a soldering tip does not carry heater current, but carries only heat sensing information making the voltage of the soldering tip readily controllable. Advantageously, the connection to the second (outer) sheath is grounded by the temperature control unit.

In a preferred embodiment, heat sensing element, the heating element, the first sheath and the second sheath are all concentrically disposed and radially separated about one another in the order stated. Separations between the adjacent concentric parts are filled with heat conducting electrical insulation. The soldering tip is brazed to the outer second sheath which is a part of the temperature sensing circuit.

The first and second sheath are electrically and mechanically connected to a steel bushing which is also connected to one terminal of the heating element and to a wire or rod of dissimilar metal such as constantan. The joining of the constantan wire and the bushing forms a thermocouple junction heat sensing element which can be monitored between the second (outer) sheath and the constantan wire. An additional conductive tubular member is disposed around and insulated from the constantan wire and electrically connected to the other end of the heating element. The heating voltage can be applied to the heating element by connections to the first (inner) sheath and the tubular member.

The use of a copper brazed steel tube for the outer sheath provides the necessary structural strength to the heating apparatus while limiting the leakage voltage at the soldering tip to acceptable levels. Also, the use of a substantially straight constantan wire passing through an opening in the heating element provides accurate temperature measurement and long operational lifetime for the apparatus.

DETAILED DESCRIPTION OF THE PREFERRED EMBODIMENT

Figure 1:
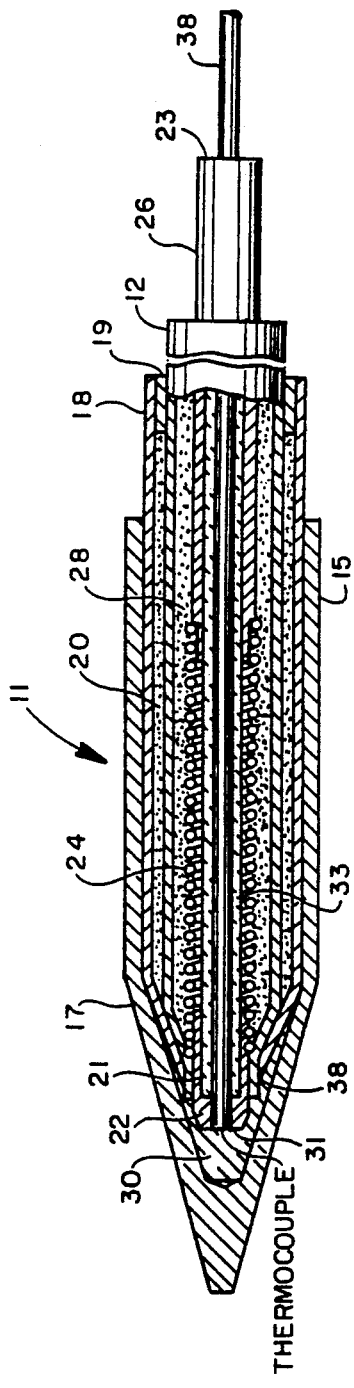
FIG. 1 is a sectional view of an embodiment of a soldering iron heating apparatus.

A heating apparatus embodying the present invention for use as a soldering iron is shown in sectional view in FIG. 1. The heating apparatus 11 includes a heating element 24 and a heat sensing element 30. Heating element 24 and a portion of the heat sensing element are coaxially disposed within an electrically conductive inner tubular sheath 12, which is in turn disposed within an electrically conductive outer tubular sheath 18. A soldering tip 17 of the apparatus is mechanically and electrically connected to the outer sheath 18 by brazing.

A metal bushing 22 is central to the mechanical and electrical connections of heating apparatus 11 and forms a part of both the heating and heat sensing circuits. The heat sensing element includes a thermocouple junction 30 formed between metal bushing 22 and a constantan rod or wire 38. The wire 38 is welded into a cylindrical aperture of bushing 22 and extends the length of the heater apparatus 11. After welding, wire 38 is trimmed flush with face 31 of bushing 22. A ceramic tube 33 fits over the constantan wire 38 to insulate the wire from electrical contact with other parts of the apparatus. Insulator 33 is inserted into a cylindrical recess 21 in bushing 22 and runs along wire 38 to a point 23. In the preferred embodiment, steel having an AISI-SAE designation 1010 is used for bushing 22.

The heater element 24 is a helically wound coil of resistance wire coaxially surrounding and radially separated from the insulator 33. One end or terminal of the heater coil 24 is welded to bushing 22, while the other terminal of the heater coil 24 is welded to a conductive tube 26 which is coaxially disposed over insulator 33. The inner sheath 12 is concentrically disposed about both heater coil 24 and conductive tube 26 and is welded to bushing 22 over the welded end coils of heater 24. After welding, the bushing end of inner sheath 12 is swaged to conform with bushing 22. The space within inner sheath 12 is filled with an insulator 28 such as powered, packed magnesium oxide. The insulation packed in inner sheath provides good thermal conductivity and electrically insulates the heater coil 24 voltages from other conductive components.

Outer tubular sheath 18 which forms one of the conductors to the thermocouple junction 30 is welded and swadged to bushing 22 at a point between inner sheath 12 and the face 31 of bushing 22. Outer sheath 18 is coaxial with and radially separated from inner sheath 12. The circular separation between outer sheath 18 and inner sheath 12 is filled with an insulator 20 such as packed magnesium oxide which is held in place by an insulator ring 19.

Figure 2:
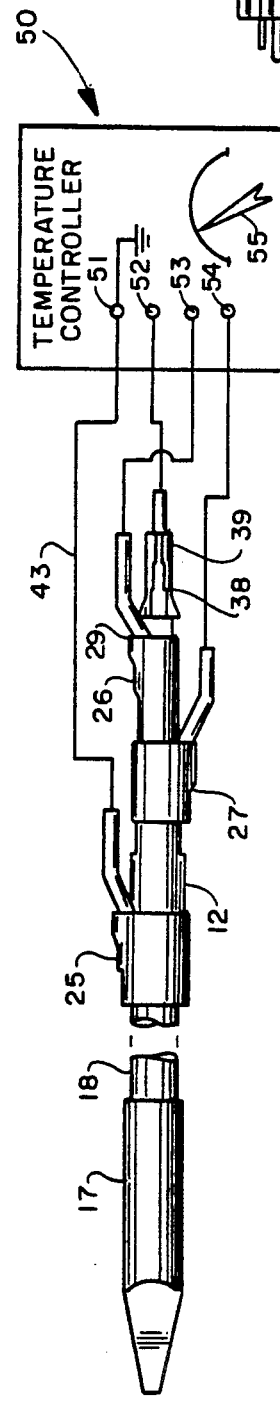
FIG. 2 shows connections between the heating apparatus of FIG. 1 and a temperature controller.

FIG. 2 shows the heating apparatus 11 including the electrical connections to a temperature controller 50. The temperature of soldering tip 17 is controlled by varying the voltage applied to heating coil 24. In the present embodiment, varying the voltage between connection 29 of tube 26 and connection 27 of inner sheath 12 varies the voltage applied to coil 24.

The voltage generated by the thermocouple, and thus the temperature of the tip 17, is measured between connections 39 and 25 of constantan rod 38 and outer sheath 18, respectively. Temperature controller 50 includes temperature sensing terminals 51 and 52 which are respectively connected to outer sheath 18 and the constantan wire 38 of heating apparatus 11. Advantageously, terminal 51 is grounded at temperature controller 50 and is connected to outer sheath 18 by an iron wire 43. Temperature controller 50 reads the voltage developed by the thermocouple within heating apparatus 11 and compares the voltage so read with a temperature representing threshold voltage established by an operator controlled potentiometer 55. When the comparison indicates that the tip temperature is different than desired, the voltage applied between terminals 53 and 54 is increased or decreased, depending on the direction of the sensed difference. The voltage between terminals 53 and 54 is applied to heater element 24 (FIG. 1) by tube 26 and inner sheath 12.

Figure 3:
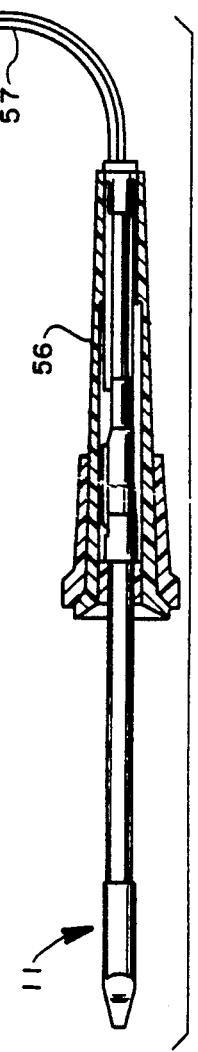
FIG. 3 is a sectional view of a soldering iron.

After assembly, the heating apparatus 11 is placed in a suitable handle 56 and attached thereto by high temperature epoxy as shown in FIG. 3. A cord 57 with a connector 58 is used to connect the soldering iron to the temperature controller 50. In operation, soldering tip 17 is maintained substantially at ground potential due to the connection of outer sheath 18 to ground by the temperature controller 50.

In the preferred embodiment, outer sheath 18 is manufactured by rolling copper plated steel strip into the form of a double walled tube and subsequently, copper brazing it in a reducing atmosphere. After brazing, the tube is cold-swaged into dimension and annealed. In the trade, the tube from which outer sheath 18 is made is referred to as Bundyweld manufactured by the Bundy Tubing Company of Detroit, Mich. With the described construction, resistance of less than 2 ohms is exhibited between the soldering iron tip and ground and soldering iron tip voltages of less than 2 millivolts with respect to ground are maintained.

While a preferred embodiment of the invention has been illustrated, it will be obvious to those skilled in the art that various modifications and changes may be made thereto without departing from the scope of the invention as defined in the appended claims.

What is claimed is:

1. A temperature controlled electric heating apparatus comprising:
   a first hollow elongated electrically conductive sheath;
   electric resistance heating means disposed within said first sheath and separated therefrom by insulation, said heating means having a first electrical terminal connected to one end of said first sheath and a second electrical terminal electrically insulated from said first sheath;
   a second hollow elongated electrically conductive sheath disposed around said first sheath and having electrical insulation between the outer surface of said first sheath and the inner surface of said second sheath;
   heat sensing means disposed within and in thermal communication with said apparatus, said heat sensing means being electrically connected to one end of said second sheath and to an electrical conductor electrically insulated from said electric resistance heating means and disposed with said first sheath;
   means for electrically connecting a source of electrical power between a point on said first sheath separate from said one end and said heating means second terminal; and
   means for electrically connecting temperature sensing circuitry between a point on said second sheath separated from said one end and said electrical conductor of said heat sensing means.

2. The heating apparatus of claim 1 comprising means for connecting said second sheath to electrical ground potential.

3. The heating apparatus of claim 2 wherein said heat sensing means is in thermal communication with a soldering tip mounted to said one end of said second sheath.

4. The heating apparatus of claim 1 comprising:
a soldering tip mounted to said one end of said second sheath; and
wherein said electrical conductor of said heat sensing means comprises a constantan wire and said heat sensing means comprises a thermocouple junction between said constantan wire and a dissimilar metal member disposed in said soldering tip and electrically connected to said one end of said second sheath.

5. The heating apparatus of claim 4 wherein said second sheath is made from a copper brazed steel tube.

6. The heating apparatus of claim 1 wherein said heat sensing means comprises a metal bushing mechanically and electrically connected to said one end of said second sheath and to said electrical conductor of said heat sensing means, said electrical conductor of said heat sensing means being of dissimilar metal to that of said bushing to form a thermocouple junction therewith.

7. The heating apparatus of claim 6 wherein said electrical conductor of said heat sensing means is a constantan wire and said bushing is made of steel.

8. The heating apparatus of claim 7 wherein said second sheath is made from a copper brazed steel tube.

9. The heating apparatus of claim 7 wherein said heating means is a helically wound electrical resistor and said electrical conductor of said heat sensing means is a substantially straight wire, a portion of which is coaxially disposed within said heating means.

10. The heating apparatus of claim 1 wherein said second sheath is substantially coextensive in length with said first sheath.

* * * * *